United States Patent
Urmanov et al.

(10) Patent No.: US 9,397,921 B2
(45) Date of Patent: Jul. 19, 2016

(54) METHOD AND SYSTEM FOR SIGNAL CATEGORIZATION FOR MONITORING AND DETECTING HEALTH CHANGES IN A DATABASE SYSTEM

(71) Applicant: Oracle International Corporation, Redwood Shores, CA (US)

(72) Inventors: Aleksey M. Urmanov, San Diego, CA (US); Anton A. Bougaev, San Diego, CA (US); Jonathan D. Klein, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 404 days.

(21) Appl. No.: 13/796,605

(22) Filed: Mar. 12, 2013

(65) Prior Publication Data

US 2014/0280860 A1    Sep. 18, 2014

(51) Int. Cl.
*H04L 12/26* (2006.01)
*H04L 12/24* (2006.01)

(52) U.S. Cl.
CPC ............ *H04L 43/16* (2013.01); *H04L 43/0817* (2013.01); *H04L 41/142* (2013.01); *H04L 43/12* (2013.01)

(58) Field of Classification Search
CPC . H04L 12/1868; H04L 43/0823; H04L 43/16; H04L 41/5035; H04L 43/0817

USPC .......... 709/224, 225, 226, 202, 203
See application file for complete search history.

(56) References Cited

U.S. PATENT DOCUMENTS

| | | | |
|---|---|---|---|
| 5,630,048 A * | 5/1997 | La Joie et al. ............ | 714/25 |
| 5,933,594 A * | 8/1999 | La Joie et al. ............ | 714/26 |
| 7,660,775 B2 | 2/2010 | Bougaev et al. | |
| 7,752,013 B1 * | 7/2010 | Broyles .................... | 702/182 |
| 8,255,516 B1 * | 8/2012 | Zhang et al. ............. | 709/224 |
| 2002/0194319 A1 * | 12/2002 | Ritche ............. | H04L 41/0631 709/223 |
| 2007/0185990 A1 * | 8/2007 | Ono et al. ............... | 709/224 |
| 2008/0016206 A1 * | 1/2008 | Ma et al. ................. | 709/224 |
| 2009/0248753 A1 * | 10/2009 | Tsai et al. ............... | 707/202 |
| 2009/0328050 A1 * | 12/2009 | Liu et al. ................ | 718/104 |
| 2012/0079098 A1 * | 3/2012 | Moehler et al. .......... | 709/224 |

* cited by examiner

*Primary Examiner* — Ruolei Zong
(74) *Attorney, Agent, or Firm* — Osha Liang LLP

(57) ABSTRACT

A method for generating instructions for a monitoring facility. The method includes obtaining a signal from a data server, where the data server is monitored by the monitoring facility using a task, identifying a signal characteristic of the signal, and determining a first category for the signal based on the signal characteristic. The method further includes identifying a first signal processing tool for the signal based on the task and the first category and instructing the monitoring facility to perform the task by applying the first signal processing tool to the signal.

17 Claims, 9 Drawing Sheets

METHOD AND SYSTEM FOR SIGNAL CATEGORIZATION FOR MONITORING AND DETECTING HEALTH CHANGES IN A DATABASE SYSTEM

BACKGROUND

Modern computer service providers rely on data servers and other complex computer systems to provide a variety of essential functions. These systems must be constantly monitored for abnormal behavior that can quickly escalate into major system issues. However, many of these systems are monitored for a large number of various metrics. Detecting abnormalities in such large streams of data can be onerous. Further, once an abnormality is discovered, a system administrator may have very little time to decide how to handle the abnormality.

SUMMARY

In general, in one aspect, the invention relates to a method for generating instructions for a monitoring facility. The method includes obtaining a signal from a data server, where the data server is monitored by the monitoring facility using a task, identifying a signal characteristic of the signal, and determining a first category for the signal based on the signal characteristic. The method further includes identifying a first signal processing tool for the signal based on the task and the first category and instructing the monitoring facility to perform the task by applying the first signal processing tool to the signal.

In general, in one aspect, the invention relates to a non-transitory computer readable medium that, when executed by a processor, performs a method for generating instructions for a monitoring facility. The method includes obtaining a signal from a data server, where the data server is monitored by the monitoring facility using a task, identifying a signal characteristic of the signal, and determining a first category for the signal based on the signal characteristic. The method further includes identifying a first signal processing tool for the signal based on the task and the first category and instructing the monitoring facility to perform the task by applying the first signal processing tool to the signal.

In general, in one aspect, the invention relates to a system for generating instructions for a monitoring facility. The system includes a signal descriptor vector (SDV) assignment module, a categorization module, a task tool assignment module, and a deployment module. The SDV assignment module is configured to obtain a signal from a data server, where the data server is monitored by the monitoring facility using a task, and identify an SDV of the signal using a signal characteristic of the signal. The categorization module is configured to determine a first category for the signal based on the SDV. The task tool assignment module is configured to identify a first signal processing tool for the signal based on the task and the first category. The deployment module configured to instruct the monitoring facility to perform the task by applying the first signal processing tool to the signal.

Other aspects of the invention will be apparent from the following description and the appended claims.

DETAILED DESCRIPTION

Figure 1:
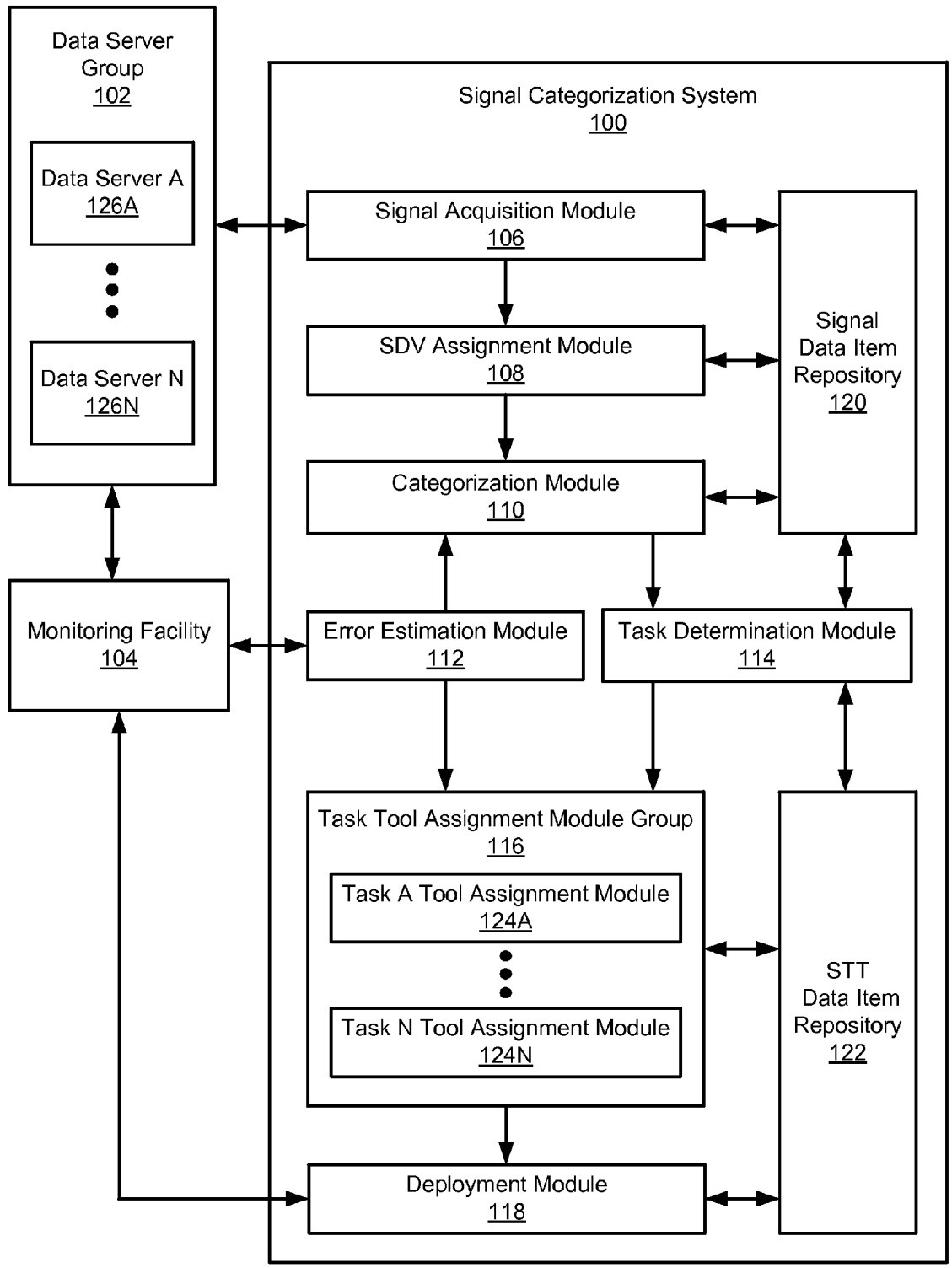
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for evaluating database (DB) parameters. Specifically, embodiments of the invention may be used to identify one or more characteristics of a DB signal and provide processing instructions to a monitoring facility based on the characteristics.

In a DB, as in any complex system, health monitoring and diagnostics are largely based on monitoring changes of observable system variables and performance metrics. For example, monitoring facilities monitor a wide set of computer systems, such as databases, application servers, and virtual machines. For each of these computer systems, a variety of signals may be monitored depending on the type of computer system.

One or more DBs may be monitored by a monitoring facility. The monitoring facility measures the health of a DB using tasks such as detection of change, value forecasting, demand forecasting, state detection, and denial of service detection. Each task may be performed using one or more signals obtained from the DB that measure various aspects of the DB system. However, many signals must be processed using one or more processing tools before those signals may be effectively used to perform a task. Embodiments of the present invention may be used to determine an effective set of tools for processing a signal for a task, and provide those tools to a monitoring facility for use in monitoring the DB.

FIG. 1 shows a diagram of a system in accordance with one or more embodiments of the invention. As shown in FIG. 1, a signal categorization system (100) is communicatively connected to a data server group (102) and a monitoring facility (104). The signal categorization system (100) includes a signal acquisition module (106), a signal descriptor vector (SDV) assignment module (108), a categorization module (110), an error estimation module (112), a task determination module (114), a task tool assignment module group (116), a deployment module (118), a signal data item repository (120), and a signal-task-tool (STT) data item repository (122). The task tool assignment module group (116) includes multiple task tool assignment modules (task A tool assignment module (124A), task N tool assignment module (124N)). The data server group (102) includes multiple data servers (data server A (126A), data server N (126N)).

In one or more embodiments of the invention, the data servers (data server A (126A), data server N (126N)) are computer systems or groups of computer systems with functionality to provide data and or applications to connected clients (not shown). In one embodiment of the invention, the data servers (data server A (126A), data server N (126N)) include multiple data server elements which are monitored by probes. In one or more embodiments of the invention, the data servers (data server A (126A), data server N (126N)) may be implemented as database servers hosting databases.

In one or more embodiments of the invention, the monitoring facility (104) is a computer system or group of computer systems with functionality to monitor one or more data servers (data server A (126A), data server N (126N)) in a data server group (102). In embodiment of the invention, the monitoring facility (104) may be implemented as part of a computer system or group of computer systems configured to manage a set of computer systems, such as within an enterprise network. In one embodiment of the invention, the monitoring facility (104) includes functionality to measure signals from the data server group (102). In addition, the monitoring facility (104) may also include functionality to estimate an error when applying a processing tool to a signal, and provide the error estimation to the signal categorization system (100).

In one or more embodiments of the invention, the signal categorization system (100) is a computer system or group of computer systems with functionality to instruct one or more monitoring facilities (e.g., monitoring facility (104)) regarding the manner in which to monitor health of the one or more data servers (data server A (126A), data server N (126N)). Specifically, the signal categorization system (100) includes functionality to obtain data (i.e., signals) from one or more data servers (data server A (126A), data server N (126N)), evaluate the characteristics of the data, and determine an effective manner of processing the data to extract meaningful information about the health of the targeted data servers (data server A (126A), data server N (126N)).

In one or more embodiments of the invention, the signal categorization system (100) and/or the monitoring facility (104) include functionality to deploy data gathering software processes (referred to as probes) on one or more data servers (data server A (126A), data server N (126N)). Such probes may be deployed to measure one or more data server elements on the data server (data server A (126A), data server N (126N)). As used herein, the term data server element refers to a measurable hardware or software component of a data server (data server A (126A), data server N (126N)). Such measurable components include, but are not limited to, a central processing unit (CPU), memory, storage, network stack, and operating system kernel.

In one embodiment of the invention, a probe measures one or more aspects related to a data server element. In one embodiment of the invention, a signal is a set of measurements of a data server element obtained by a probe and relayed back to the signal categorization system (100) and/or monitoring facility (104). In one embodiment of the invention, a signal is a measurement of time (e.g., the amount of time a task takes to execute), a measurement of usage (e.g., percentage of memory used), or a measurement of an amount (e.g., number of tasks waiting to execute). Other types of signals may be used without departing from the invention. Specific examples of signals include, but are not limited to, percent of archive area used, average file read/write time, broken job count, percent of lock limit usage, service CPU time per user call, service response time per user call, deferred transaction count, dump area used, percent of buffer cache hit, CPU usage per second, CPU usage per transaction, percent of cursor cache hit, data dictionary hit, percent of database CPU time, global cache average convert time, percent of standard query language (SQL) response time, percent of Java™ pool free, percent of hypertext transfer protocol (HTTP) 200s responses, requested handling time for a module, requested handling throughput for a module, active http connections, response data throughput, database management system job processing time, database management system job uptime, job dispatcher job step average backlog, job dispatcher processing time, rows per hour of the loader throughput, notification processing time, number of roles, percent of CPU consumption, number files open, number threads created, percent of resident memory utilization, virtual memory utilization, and virtual memory utilization growth.

In one or more embodiments of the invention, the signal categorization system (100) includes multiple modules used to evaluate a set of signals from one or more data servers (data server A (126A), data server N (126N)). In one embodiment of the invention, the signal acquisition module (106) is a process or group of processes with functionality to receive one or more unprocessed (i.e., raw) signals from one or more data servers (e.g., data server group (102)). The signal acquisition module (106) may further include functionality to deploy one or more probes used to measure a data server element and send the measurements to the signal acquisition module (106) in the form of a raw signal. In one embodiment of the invention, the signal acquisition module (106) generates a signal data item for each signal acquired from the data servers (e.g., data server group (102)) and stores the signal data item in the signal data item repository (120). Further details regarding signal data item(s) is provided in FIG. 2.

In one or more embodiments of the invention, the signal descriptor vector (SDV) assignment module (108) is a process or group of processes with functionality to preprocess raw signal values obtained by the signal acquisition module (106) to determine the characteristics of the signal. In one embodiment of the invention, these characteristics are described using an SDV. In one embodiment of the invention, the SDV assignment module (108) consumes raw signals (provided directly from the signal acquisition module (106) or via the signal values stored in the signal data item) and performs a number of preprocessing actions in a nontrivial order to identify the characteristics of the signal. Examples of raw signal preprocessing include, but are not limited to, normalization, scaling, noise filtering, and nonnumber values removal. Further, signal preprocessing may include computations on signal parameters. Examples of signal parameter computations include, but are not limited to, maximum and minimum values, mean and variance, higher order statistics, autocorrelation coefficient, spectral representation, and empirical mode representation. Signal preprocessing may further include a number of checks and tests such as, for example, tests for stationary, tests for existence of moments, and tests for various distribution fits. In one embodiment of the invention, the set of preprocessing tests are stored in a test repository (not shown). The following is an example of an ordered set of preprocessing actions: 1. determine whether the signal has measurable (finite) statistical parameters; 2. calculate any existing (finite) parameters and include them in the SDV; 3. mark corresponding portions of the SDV as valueless for any non-existent parameters; 4. determine whether the signal is sparse or a regular time series; 5. determine whether the signal is quasi-continuous or discontinuous; 6. determine whether the signal is stationary or non-stationary; and 7. determine whether the signal is autocorrelated.

The result of each test is added to the SDV for the signal and stored in the associated signal data item. In one embodiment of the invention, the structure of SDV allows for accommodating the results of new tests added to the test repository. In one or more embodiments of the invention, the SDV is generated using the results of the preprocessing actions and tests that describe the signal attributes of the signal. The SDV may be implemented, for example, as a text string of Boolean results of applied preprocessing actions and tests. Using the example ordered set of preprocessing actions, the resulting SDV may be the text string "/1.no-measurable-statistical-parameters/2.-existing-parameters/3.non-existent-parameters/4.sparse/5.discontinuous/6.stationary/7.not-autocorrelated/" In one embodiment of the invention, an expert knowledge system is employed to optimize the order and number of checks and tests to most efficiently populate the entries of the SDVs.

In one or more embodiments of the invention, the categorization module (110) is a process or group of processes with functionality to determine a category for a signal based on the signal's SDV. Specifically, the categorization module (110) includes functionality to obtain an SDV for a signal, determine the an appropriate category for the signal based on the SDV, and store the determined signal category in the signal data item for the signal. The mapping between an SDV and a category may be predefined for some or all known or common SDVs. Examples of predefined signal categories include, but are not limited to, constant data, stationary time series data, nonstationary time series data, categorical data, independently and identically distributed (IID) data, discrete data, and counting process data. Further, each category may have subcategories, as needed, e.g., to reflect an underlying data generating distribution. For example, the IID data category may include subcategories for IID normal data, IID poison data, and IID Frechet data.

In one or more embodiments of the invention, the categorization module (110) maps each signal's SDV onto one or more signal categories using a dedicated mapping mechanism that includes both input from human operators and newly created mappings created by the categorization module (110). The categorization module (110) may implement a number of different mapping approaches including, for example, a table enumeration of SDV attributes to categories, an if-then rule-based expert system, and/or machine learning technologies such as classifiers that map attributes of an SDV to a category. In one embodiment of the invention, the categorization module (110) includes the functionality to create new categories for SDVs that cannot be reliably assigned to one of the existing categories.

In one or more embodiments of the invention, the task determination module (114) is a process or group of processes with functionality to obtain a task or group of tasks for a signal. In one embodiment of the invention, the manner in which the signal is processed is dependent upon the task for which the signal is used. Examples of tasks include, but are not limited to, detection of change, value forecasting, demand forecasting, state detection, denial of service detection, degradation of service detection, resource exhaustion, unbalance detection, anomaly detection, and loss of sensing detection. In one embodiment of the invention, each signal may be used for one or more than one task. In one embodiment of the invention, the task determination module (114) obtains a task or set of tasks for a signal as user input. Alternatively, the task determination module (114) utilizes a predetermined mapping between a signal and one or more tasks for that signal. Once a task or group of tasks for a signal is determined, the task determination module (114) generates an STT data item for each task associated with the signal. In one embodiment of the invention, multiple STT data items are generated for a single signal (e.g., one for each associated task).

In one or more embodiments of the invention, the task tool assignment module group (116) is a process or group of processes with functionality to determine a set of processing tools used to process a signal for a task. In one embodiment of the invention, a tool is an algorithm or set of algorithms applied to signal values in order to extract meaningful information from the signal and minimize irrelevant portions of the signal values. In one embodiment of the invention, the task tool assignment module group (116) includes multiple task tool assignment modules (task A tool assignment module (124A), task N tool assignment module (124N)). In one embodiment of the invention, each task tool assignment module (task A tool assignment module (124A), task N tool assignment module (124N)) includes functionality to assign a set of tools to a signal based on the type of signal (i.e., the signal category) and the task for which the signal is to be used. The tools assigned to a signal may differ depending upon both the signal category and the signal task. In one embodiment of the invention, the tools for a signal are selected based on their ability to reliably process the signal to extract meaningful information used to do the task. For example, a signal categorized by the categorization module (110) as IID normally distributed data for the task of change detection may be assigned a sequential probability ratio test (SPRT) for Normal distributions as a tool. As another example, a signal categorized as including nonexisting moments for change detection may be assigned an empirical model decomposition (EMD) reconstruction tool.

In one or more embodiments of the invention, the error estimation module (112) is a process or group of processes with functionality to monitor the efficiency of the assigned tools for each signal-task-tool set. In one embodiment of the invention, the error estimation module (112) obtains an estimated error for a given signal-task-tool set (e.g., stored as an STT data item in the STT data item repository) from known error calculation methods or from error data gathered by a monitoring facility (e.g., monitoring facility (104)) performing the task by implementing the tools to process the signal. The error calculation method used may depend on the associated task. For example, Bayesian error estimation may be performed to estimate the error for classification tasks. As another example, cross validation error estimation may be performed for regression and forecasting tasks. Once obtained, the error estimation may be stored in the STT data item for the signal. In one embodiment of the invention, the error estimation module (112) may further include the functionality to instruct the categorization module (110) and/or the task tool assignment module group (116) to modify the assignment of categories or tools to a signal based on an error estimation. Further detail regarding this process is provided in FIG. 6.

In one or more embodiments of the invention, the deployment module (118) is a process or group of processes with functionality to determine one or more signal-task-tool sets for deployment on a monitoring facility (e.g., monitoring facility (104)). Further detail regarding this process is provided in FIG. 5.

In one or more embodiments of the invention, the signal data item repository (120) is a combination of hardware and software used to store signal data items. Further detail regarding signal data items is provided in FIG. 2. In one or more embodiments of the invention, the STT data item repository (122) is a combination of hardware and software used to store STT data items. Further detail regarding STT data items is provided in FIG. 3.

In one or more embodiments of the invention, two different data item repositories (signal data item repository (120), STT data item repository (122)) are implemented in order to separate data items corresponding to signals (signal data items) and data items corresponding to signal-task-tool sets (STT data items). In one embodiment of the invention, there is a one to many relationship between signals and signal-task-tool sets. Similarly, there is also a one to many relationship between signal data items and STT data items.

The invention is not limited to the configuration shown in FIG. 1.

Figure 2:
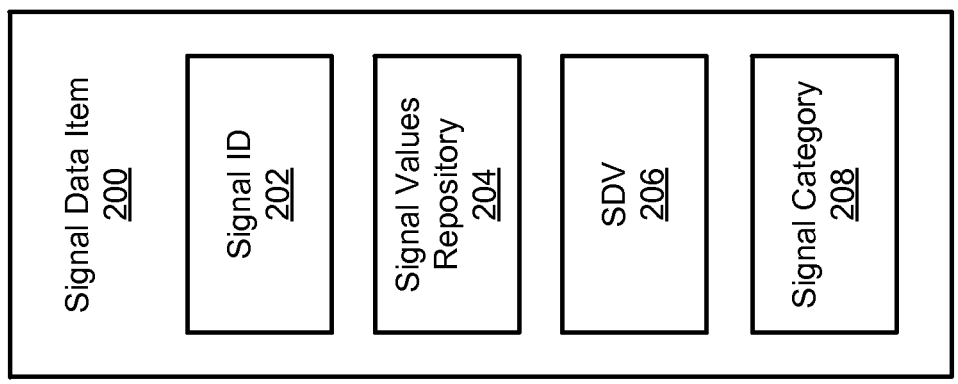
FIG. 2 shows a system in accordance with one or more embodiments of the invention.

FIG. 2 shows a signal data item in accordance with one or more embodiments of the invention. As shown in FIG. 2, the signal data item (200) includes a signal ID (202), a signal values repository (204), an SDV (206), and a signal category (208).

In one or more embodiments of the invention, the signal ID (202) is a unique identifier assigned to a signal data item used to refer to a signal data item (and its associated signal). In one embodiment of the invention, the signal ID (202) may be derived from the identifier used by the signal categorization system to associate a signal to a data server or data server group.

In one or more embodiments of the invention, the signal values repository (204) is a combination of hardware and software used to store signal values of a signal. Specifically, the signal values repository (204) may store a sampling of signal values of a signal from a data server or data server group. Such signal values may each include a measurement and a time at which the measurement was taken. The collection of signal values stored in the signal values repository (204) may be used by the SDV assignment module to determine the characteristics of a signal, and to ultimately assign an SDV to the signal.

In one or more embodiments of the invention, the SDV (206) is a data element used to store an SDV for the signal assigned by the SDV assignment module. In one or more embodiments of the invention, the signal category (208) is a data element used to store signal category for the signal assigned by the categorization module.

Figure 3:
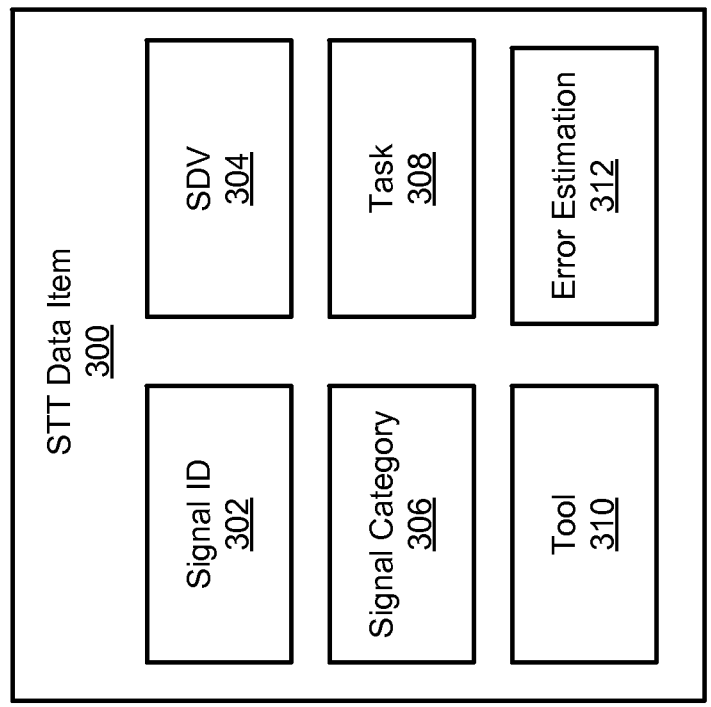
FIG. 3 shows a system in accordance with one or more embodiments of the invention.

FIG. 3 shows a STT data item in accordance with one or more embodiments of the invention. As shown in FIG. 3, the STT data item (300) includes a signal ID (302), an SDV (304), a signal category (306), a task (308), one or more tools (310), and an error estimation (312). The signal ID (302), the SDV (304), and the signal category (306) are equivalent to the corresponding elements described in FIG. 2.

In one or more embodiments of the invention, the task (308) is a data item that stores an identifier for the task assigned to the STT data item by the task determination module. In one or more embodiments of the invention, the tool(s) (310) is a data item that stores an identifier for the tool(s) assigned to the STT data item by a task tool assignment module.

In one or more embodiments of the invention, the error estimation (312) is a data item used to store a measurement of the accuracy (or inaccuracy) of the information derived from applying the tool to the signal for the task. The error estimation (312) is stored in the STT data item by an error estimation module.

Figure 4:
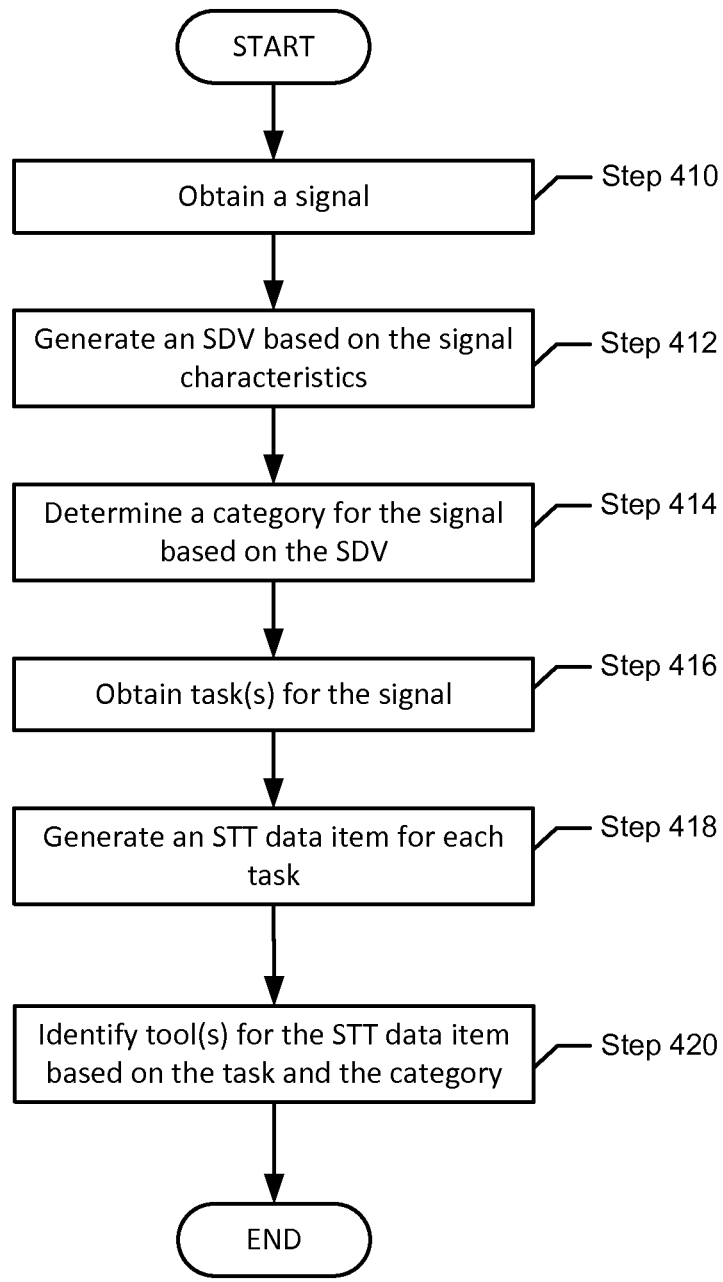
FIG. 4 shows a flow diagram in accordance with one or more embodiments of the invention.

FIG. 4 shows a flowchart for generating a signal-task-tool set (e.g., an STT data item) in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, the signal acquisition module obtains a signal. In one embodiment of the invention, a signal is obtained by receiving a sample of signal values of the signal. In one embodiment of the invention, the signal values are stored in a signal data item. In Step 412, the SDV assignment module generates an SDV based on the characteristics of the signal. In one embodiment of the invention, the signal characteristics of a signal are determined using one or more preprocessing methods. In one embodiment of the invention, the generated SDV is stored in a signal data item for the signal. In Step 414, the categorization module determines a category for the signal based on the SDV. In one embodiment of the invention, the signal is categorized using a signal-to-category map. In one embodiment of the invention, an SDV the with no corresponding category may trigger the categorization module to create a new category to map to the SDV.

In Step 416, the task determination module obtains one or more tasks for the signal data item. In one embodiment of the invention, the one or more tasks are obtained from user input specifically associating a task with a signal. In Step 418, the task determination module generates an STT data item for each task associated with the signal. in one embodiment of the invention, multiple STT data items may be created for a single signal data item. In Step 420, a task tool assignment module identifies a tool or set of tools used to process the signal for the specific task obtained in FIG. 416. In one embodiment of the invention, an identifier for the tool or set of tools is stored in the STT data item for the signal.

Figure 5:
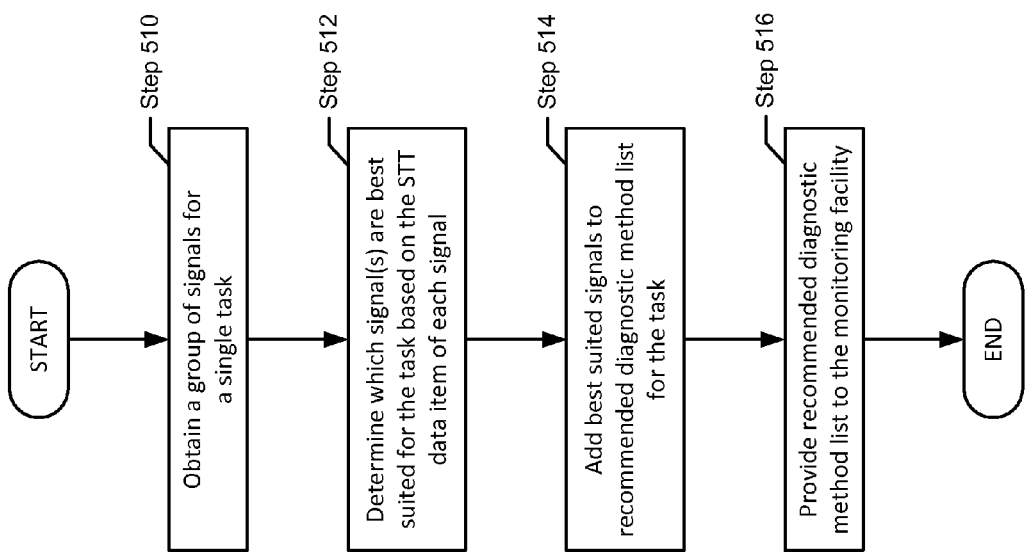
FIG. 5 shows a flow diagram in accordance with one or more embodiments of the invention.

FIG. 5 shows a flowchart for deploying a signal-task-tool instruction to a monitoring facility in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In one or more embodiments of the invention, the process described below in FIG. 5 is performed subsequent to one or more STT data items being created by the process described above in FIG. 4. Specifically, FIG. 5 describes one embodiment of the invention in which the deployment module takes a given task and determines which STT data items to provide to the monitoring facility for performing that task.

In Step 510, the deployment module obtains a group of signals for a task. In one embodiment of the invention, obtaining a group of signals includes determining a set of STT data items stored in an STT data item repository that are designated for the given task (e.g., share the task designation as stored in each STT data item). In one embodiment of the invention, multiple signals (and therefore multiple SDT data items) may be designated for a single task. Further, each signal designated for a task may have a different signal category.

In Step 512, the deployment module determines the signal or signals that are best suited for the task based on the STT data item of each signal. In one embodiment of the invention, the best suited signals are determined using the error estimation data item within each STT data. In one embodiment of the invention, the best suited signals are determined using other elements stored in the STT data item (e.g., the SDV, the signal category, etc.). In one embodiment of the invention, the signal or signals with the lowest error estimation are designated as the signals best suited for the given task. In one embodiment of the invention, the signal or signals associated with comparatively accurate tools are selected as the best suited for the given task. For example, the best suited signals may be selected based on the tool with smallest estimated Bayes error or smallest cross-validation-based prediction error. As another example, the best suited signals may be selected by averaging or weighting of the results of the selected tools for the given task.

In Step 514, the signals determined as best suited for the task are added to a recommended diagnostic method list. In one embodiment of the invention, the recommended diagnostic method list is a group of signal-task-tool sets (e.g., STT data items) provided to a monitoring facility. In Step 516, the deployment module provides the recommended diagnostic method list to the monitoring facility. Once received by the monitoring facility, the monitoring facility uses the information in the recommended diagnostic method list to monitor the health the targeted data server. Specifically, the monitoring facility performs the monitoring tasks by applying the provided tools to signals. In one embodiment of the invention, the monitoring facility is provided STT data items, and includes functionality to parse the STT data items to determine the signal-task-tool set.

Figure 6:
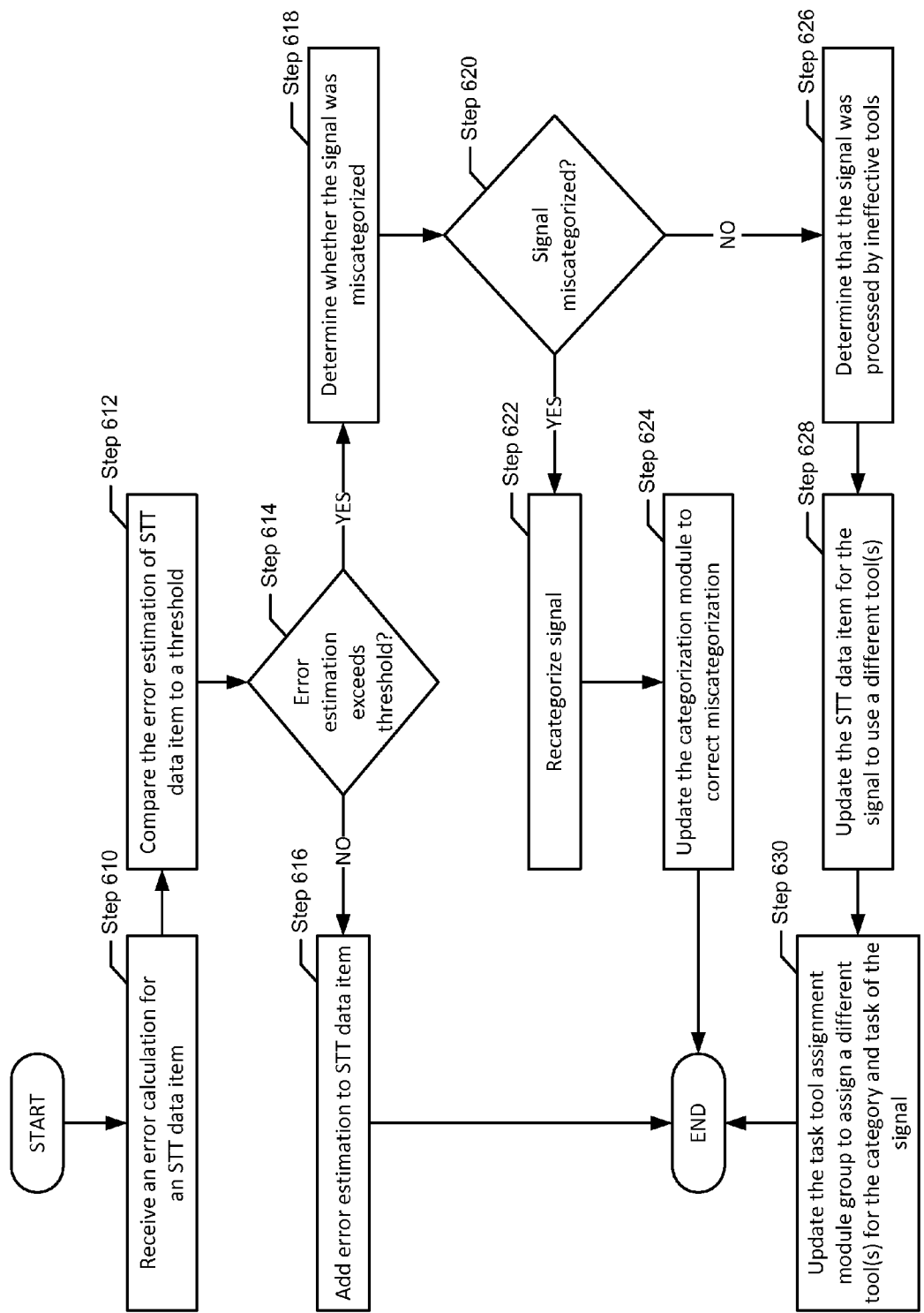
FIG. 6 shows a flow diagram in accordance with one or more embodiments of the invention.

FIG. 6 shows a flowchart for obtaining an error estimation for a signal in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the error estimation module receives an error calculation for an STT data item. In one embodiment of the invention, the error estimation is received from a monitoring facility implementing the signal-task-tool set. In one embodiment of the invention, the error estimation is obtained by calculating the accuracy of applying a tool to a signal for a task. In Step 612, the error estimation module compares the error estimation of the STT data item to a threshold. In one embodiment of the invention, the threshold is a error estimation value that indicates the minimal acceptable level of accuracy of information generated by applying a tool to a signal for a task.

In Step 614, a determination is made regarding whether the error estimation of the STT data item exceeds the threshold. If in Step 614, the error estimation of the STT data item does not exceed the threshold, then in Step 616, the received error estimation is added to the STT data item. In one embodiment of the invention, the error estimation stored in the STT is used by the deployment module to determine which STT data items among a group of STT data items should be recommended for use by the monitoring facility. If in Step 614, the error estimation of the STT data item does exceed the threshold, then in Step 618, a determination is made regarding whether the signal was miscategorized. In one embodiment of the invention, determining whether a signal is miscategorized includes comparing the error estimation to the known accuracy of the information obtained from applying the tool to the signal.

In Step 620, a determination is made regarding whether the signal is miscategorized. In one embodiment of the invention, the error estimation includes an indication regarding whether a signal is miscategorized. For example, the error estimation may indicate that the signal is not behaving in a manner consistent with other similarly categorized signals (e.g., an error estimation significantly higher than similarly categorized signals being processed by similar tools).

If in Step 620, the error estimation module determines that the signal is miscategorized, then in Step 622, the signal is recategorized. In one embodiment of the invention, the signal is recategorized by selecting an alternative category for the signal based on the signal's SDV. In one embodiment of the invention, recategorizing the signal includes updating the signal data item and/or the STT data item(s) for the signal. In Step 624, the categorization module is updated to correct the miscategorization. In one embodiment of the invention, the error estimation module reconfigures the categorization module to assign the alternative category to signals with similar or identical SDVs.

If in Step 620, the error estimation module determines that the signal is not miscategorized, then in Step 626, the error estimation module determines that the signal is processed by ineffective tools. In Step 628, the error estimation module updates the STT data item for the signal to use an alternative tool or tools. In Step 630, the error estimation module updates the task tool assignment module group to assign the alternative tool or tools to signals with similar or identical categories and tasks.

Figure 7A:
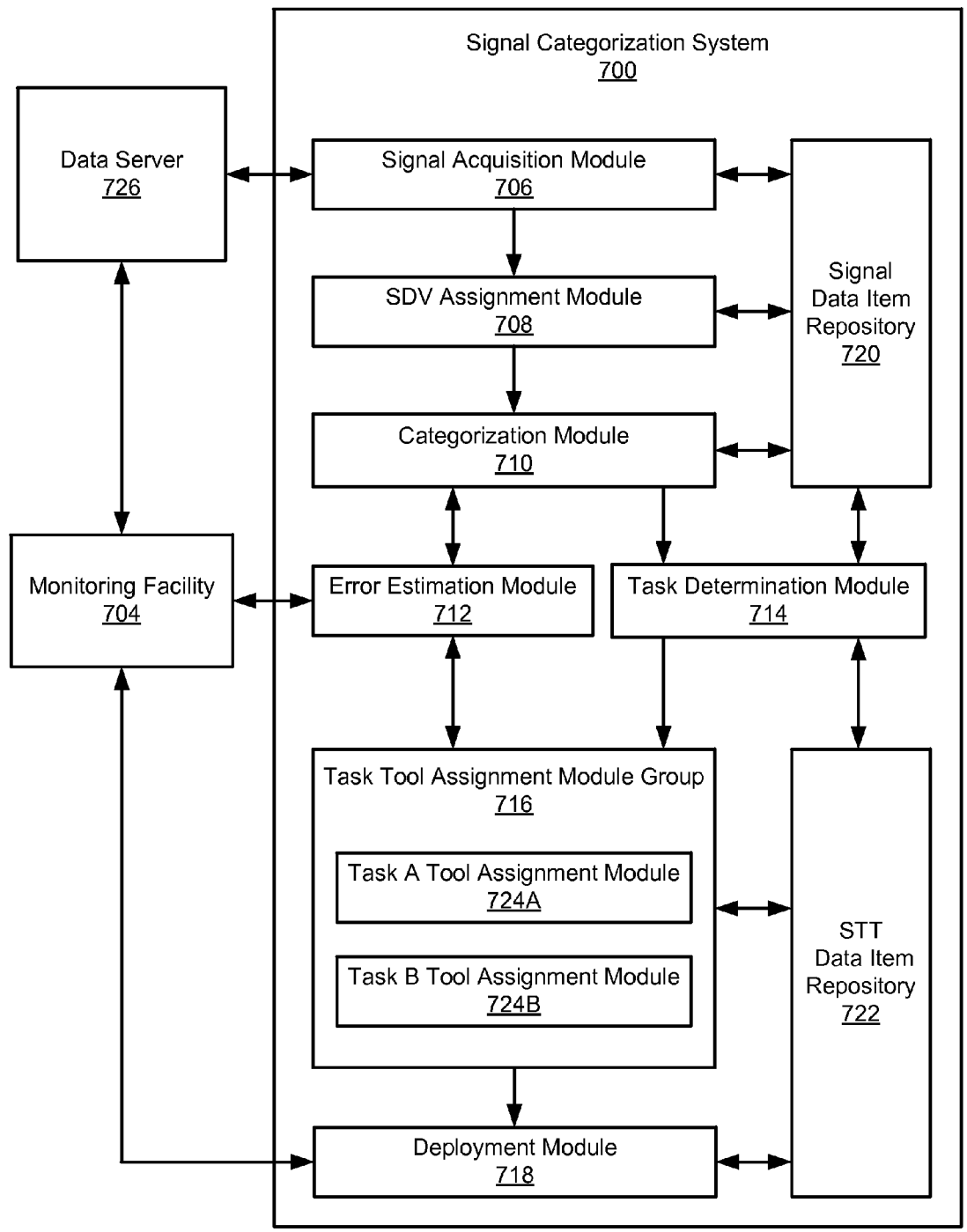
FIGS. 7A-7C show an example in accordance with one or more embodiments of the invention.
Figure 7B:
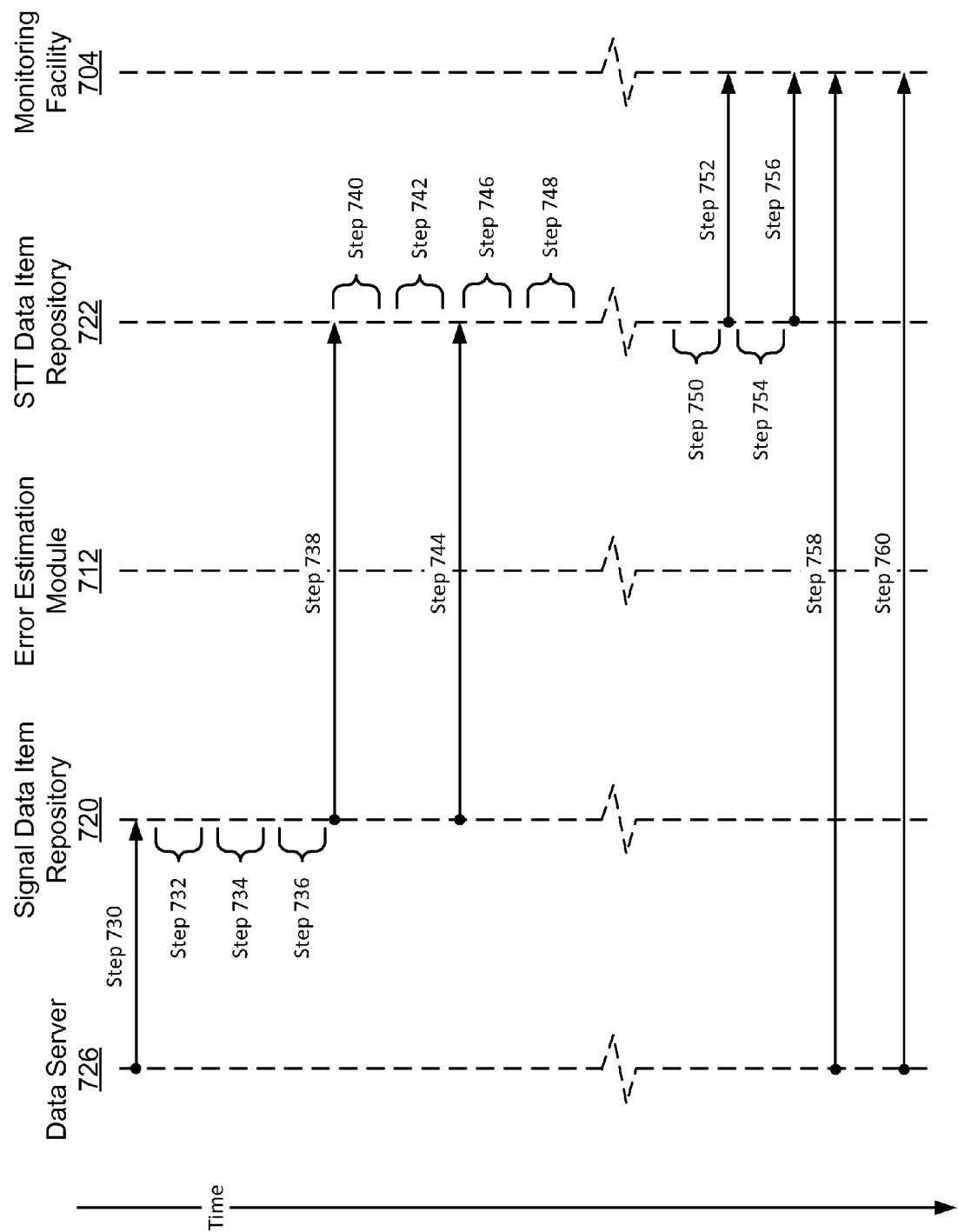
Figure 7C:
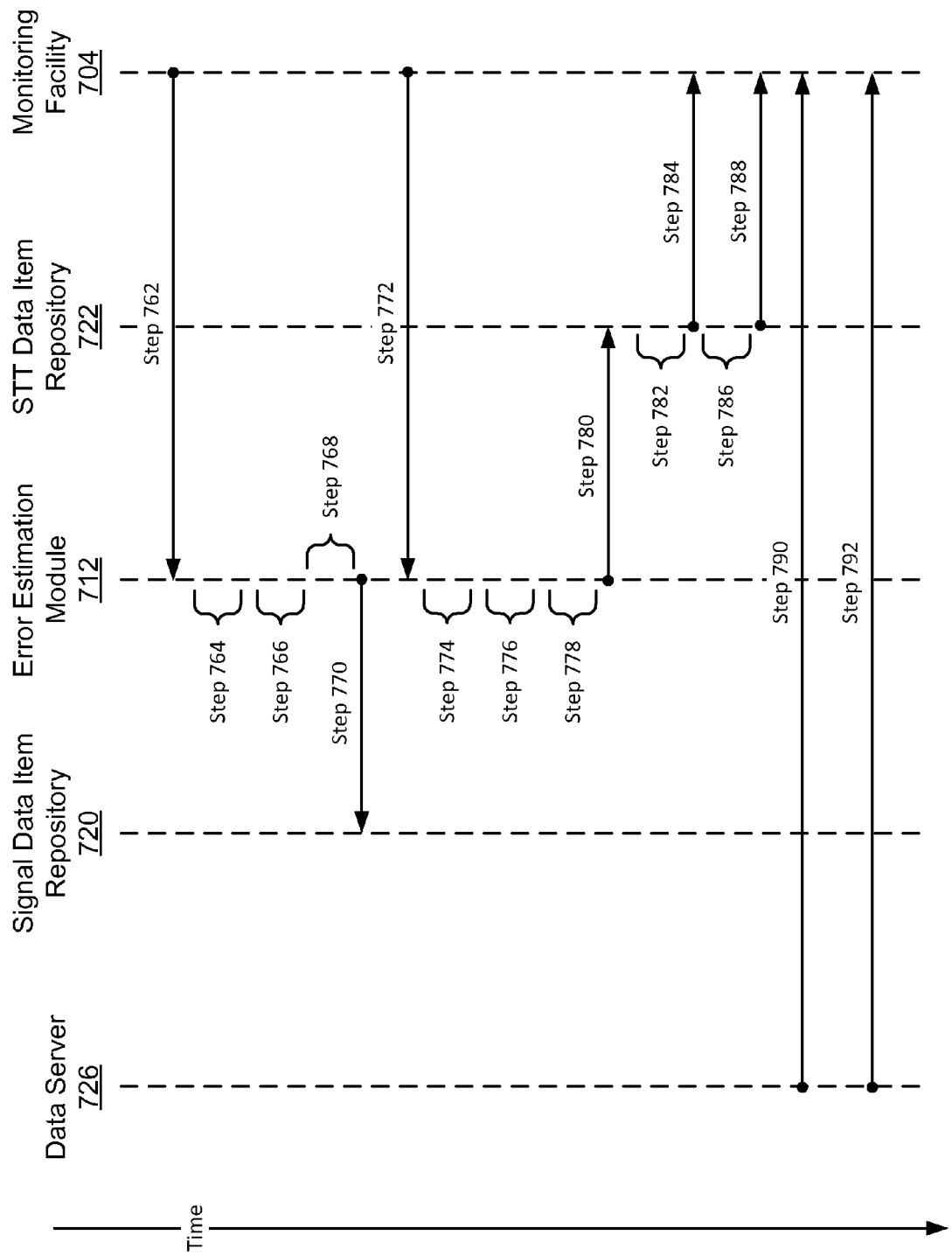

FIGS. 7A-7C show an example in accordance with one or more embodiments of the invention. The example shown in FIGS. 7A-7C is not intended to limit the invention. FIG. 7A shows an example system. As shown in FIG. 7A, the example system includes a signal categorization system (700) communicatively connected to a single data server (708) and a monitoring facility (704). The signal categorization system (700) includes a signal acquisition module (706), an SDV assignment module (708), a categorization module (710), an error estimation module (712), a task determination module (714), a task tool assignment module group (716), a deployment module (718), a signal data item repository (720), and an STT data item repository (722). The task tool assignment module group (716) includes two task tool assignment modules (task A tool assignment module (724A), task B tool assignment module (724B)).

FIG. 7B shows a timeline in accordance with one or more embodiments of the invention. In Step 730, signal values are received by the signal acquisition module (706). For the purposes of the example in FIGS. 7A-7C, assume that the signal (signal A) is the measurement of the percentage of memory utilization within the data server (726). Therefore, each signal value is an individual measurements of the percentage of memory utilization at a given point in time. Also in Step 730, the signal acquisition module (706) generates a signal data item, stores a sample of signal values for the signal in the signal data item, and passes a reference to the signal data item to the SDV assignment module (708).

In Step 732, the SDV assignment module (708) applies a number of preprocessing methods to the signal values stored in the signal data item to generate an SDV for the signal. Also in Step 732, the SDV assignment module (708) stores the SDV in the signal data item and passes a reference to the signal data item to the categorization module (710). For the purposes of this example, assume that the SDV assignment module (708) has identified measureless parameters in the signal, and includes that information in the SDV stored in the signal data item.

In Step 734, the categorization module (710) determines a category for the signal based on the SDV and stores the category in the signal data item. Also in Step 734, the categorization module (710) passes a reference to the signal data item to the task determination module (714). In Step 736, the task determination module (714) obtains the tasks for the signal associated with the signal data item. For the purposes of this example, assume that a user has indicated that the signal is used for the tasks of change detection (task A) and service degradation detection (task B).

In Step 738, the task determination module (714) generates an STT data item for the signal-change detection pair and passes a reference to the STT data item to the task tool assignment module group (716). In Step 740, the task A tool assignment module (724A) assigns the empirical mode decomposition (EMD) tool to the STT data item for change detection. In Step 742, the task A tool assignment module (724A) stores an identifier for the EMD tool in the STT data item for change detection.

In Step 744, the task determination module (714) generates another STT data item for the signal-service degradation detection pair and passes a reference to the STT data item to the task tool assignment module group (716). In Step 746, the task B tool assignment module (724B) assigns the data decycler tool to the STT data item for service degradation detection. In Step 748, the task B tool assignment module (724B) stores an identifier for the data decycler tool in the STT data item for service degradation detection.

For the purposes of the example, assume that after Step 748 and before Step 750, two other signals are received (signal B and signal C). Further, assume that the method above was applied to each of the received signals, and that each of the received signals are also designated to the tasks of change detection (task A) and service degradation detection (task B). Finally, assume that after the method above is applied to signal A, signal B, and signal C, the signal data item repository contains three signal data items (a signal data item for signal A, a signal data item for signal B, and a signal data item for signal C), and that the STT data item repository contains six signal data items (an STT for signal A-task A, an STT for signal A-task B, an STT for signal B-task A, an STT for signal B-task B, an STT for signal C-task A, and an STT for signal C-task B).

In Step 750, the deployment module (718) determines the best suited STT data items for deployment for the task of change detection (task A). Assume that the STT for signal B-task A uses a more accurate tool than the tools assigned to either the STT for signal A-task A or the STT for signal C-task A. In Step 752, the deployment module (718) instructs the monitoring facility (704) to use the tools assigned to the STT for signal B-task A to monitor signal B for change detection.

In Step 754, the deployment module (718) determines the best suited STT data items for deployment for the task of service degradation detection (task B). Assume that the STT for signal C-task B has a lower error estimation than either the STT for signal A-task B or the STT for signal B-task B. In Step 756, the deployment module (718) instructs the monitoring facility (704) to use the tools assigned to the STT for signal C-task B to monitor signal C for service degradation detection. In Step 758, the monitoring facility (704) obtains signal values for signal B, and applies the tools as instructed to monitor the data server (726) for a change. In Step 760, the monitoring facility (704) obtains signal values for signal C, and applies the tools as instructed to monitor the data server (726) for service degradation.

In Step 762, the error estimation module (712) obtains an error estimation from the monitoring facility (704) for signal B-task A using the tools as instructed. In Step 764, the error estimation module (712) compares the error estimation to the threshold. Assume that the error estimation received for signal B-task A exceeds the threshold. In Step 766, the error estimation module (712) determines that signal B was miscategorized. In Step 768, the error estimation module (712) reconfigures the categorization module (710) to use an alternative category for signals with SDVs similar or identical to the SDV for signal B. In Step 770, the error estimation module (712) applies the alternative category to the signal data item for signal B.

In Step 772, the error estimation module (712) obtains an error estimation from the monitoring facility (704) for signal C-task B using the tools as instructed. In Step 774, the error estimation module (712) compares the error estimation to the threshold. Assume that the error estimation received for signal C-task B exceeds the threshold. In Step 776, the error estimation module (712) determines that signal B was not miscategorized but was processed using ineffective tools. In Step 778, the error estimation module (712) reconfigures the task B tool assignment module to assign alternative tools to signals with categories similar or identical to the category of signal C. In Step 780, the error estimation module (712) reconfigures the STT for signal C-task B to use the alternative tools.

In Step 782, the deployment module (718) determines the best suited STT data items for deployment for the task of change detection (task A). Assume that the STT for signal A-task A now uses a more accurate tool than the tools currently assigned to either the STT for signal B-task A or the STT for signal C-task A. In Step 784, the deployment module (718) instructs the monitoring facility (704) to use the tools assigned to the STT for signal A-task A to monitor signal A for change detection.

In Step 786, the deployment module (718) determines the best suited STT data items for deployment for the task of service degradation detection (task B). Assume that the STT for signal B-task B now has a lower error estimation than either the STT for signal A-task B or the STT for signal C-task B. In Step 788, the deployment module (718) instructs the monitoring facility (704) to use the tools assigned to the STT for signal B-task B to monitor signal B for service degradation detection. In Step 790, the monitoring facility (704) obtains signal values for signal A, and applies the tools as instructed to monitor the data server (726) for a change. In Step 792, the monitoring facility (704) obtains signal values for signal B, and applies the tools as instructed to monitor the data server (726) for service degradation.

Figure 8:
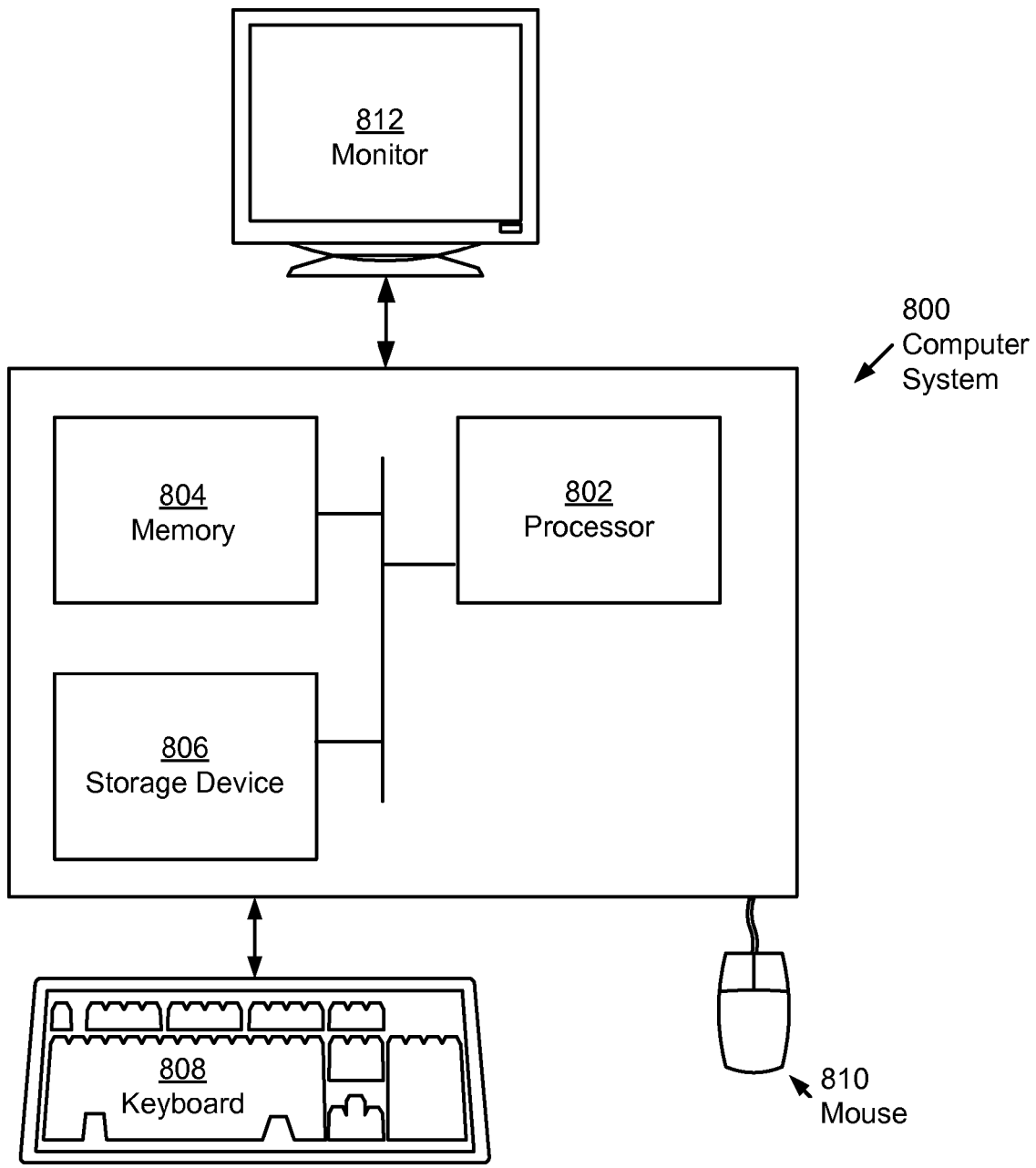
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) such as a central processing unit (CPU) or other hardware processor(s), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating instructions for a monitoring facility comprising:
    obtaining a signal from a data server, wherein the data server is monitored by the monitoring facility using a task;
    identifying a signal characteristic of the signal;
    determining a first category for the signal based on the signal characteristic;
    identifying a first signal processing tool for the signal based on the task and the first category;
    instructing the monitoring facility to perform the task by applying the first signal processing tool to the signal;
    receiving, from the monitoring facility, an error estimation for the signal obtained by calculating the accuracy of applying the tool to the signal for the task;
    determining that the signal is miscategorized based on the error estimation exceeding a threshold;
    determining an alternative category for the signal based on the signal characteristic;
    identifying an alternative signal processing tool for the signal based on the task and the alternative category; and
    instructing the monitoring facility to perform the task by applying the alternative signal processing tool to the signal.

2. The method of claim 1, further comprising:
    in response to a determination that the error estimation exceeds a threshold:
        identifying a second signal processing tool for the signal based on the task, the first category, and a determination that the first signal processing tool is ineffective; and
        instructing the monitoring facility to perform the task by applying the second signal processing tool to the signal.

3. The method of claim 1, wherein the signal is a set of measurements of a data server element of the data server.

4. The method of claim 3, wherein the data server element is a hardware component of the data server.

5. The method of claim 1, wherein the first signal processing tool is an algorithm applied to the signal in order to extract meaningful information from the signal to perform the task.

6. The method of claim 1, wherein the task is one selected from a group consisting of detection of change, value forecasting, demand forecasting, state detection, denial of service detection, degradation of service detection, resource exhaustion, unbalance detection, anomaly detection, and loss of sensing detection.

7. A non-transitory computer readable medium that, when executed by a processor, performs a method for generating instructions for a monitoring facility, the method comprising:
    obtaining a signal from a data server, wherein the data server is monitored by the monitoring facility using a task;
    identifying a signal characteristic of the signal;
    determining a first category for the signal based on the signal characteristic;
    identifying a first signal processing tool for the signal based on the task and the first category;
    instructing the monitoring facility to perform the task by applying the first signal processing tool to the signal;
    receiving, from the monitoring facility, an error estimation for the signal obtained by calculating the accuracy of applying the tool to the signal for the task;
    determining that the signal is miscategorized based on the error estimation exceeding a threshold;
    determining an alternative category for the signal based on the signal characteristic;
    identifying an alternative signal processing tool for the signal based on the task and the alternative category; and
    instructing the monitoring facility to perform the task by applying the alternative signal processing tool to the signal.

8. The non-transitory computer readable medium of claim 7, the method further comprising:
    in response to a determination that the error estimation exceeds a threshold:
        identifying a second signal processing tool for the signal based on the task, the first category, and a determination that the first signal processing tool is ineffective; and
        instructing the monitoring facility to perform the task by applying the second signal processing tool to the signal.

9. The non-transitory computer readable medium of claim 7, wherein the signal is a set of measurements of a data server element of the data server.

10. The non-transitory computer readable medium of claim 9, wherein the data server element is a hardware component of the data server.

11. The non-transitory computer readable medium of claim 7, wherein the first signal processing tool is an algorithm applied to the signal in order to extract meaningful information from the signal to perform the task.

12. The non-transitory computer readable medium of claim 7, wherein the task is one selected from a group consisting of detection of change, value forecasting, demand forecasting, state detection, denial of service detection, degradation of service detection, resource exhaustion, unbalance detection, anomaly detection, and loss of sensing detection.

13. A system for generating instructions for a monitoring facility comprising:
    signal descriptor vector (SDV) assignment circuitry for obtaining a signal from a data server, wherein the data server is monitored by the monitoring facility using a task; and identifying an SDV of the signal using a signal characteristic of the signal;

categorization circuitry for determining a first category for the signal based on the SDV;

task tool assignment circuitry for identifying a first signal processing tool for the signal based on the task and the first category;

deployment circuitry for instructing the monitoring facility to perform the task by applying the first signal processing tool to the signal; and error estimation circuitry for
- receiving, from the monitoring facility, an error estimation for the signal obtained by calculating the accuracy of applying the tool to the signal for the task;
- determining that the signal is miscategorized based on the error estimation exceeding a threshold;
- determining an alternative category for the signal based on the SDV;
- identifying an alternative signal processing tool for the signal based on the task and the alternative category; and
- instructing the monitoring facility to perform the task by applying the alternative signal processing tool to the signal.

14. The system of claim 13, wherein the error estimation circuitry,
in response to a determination that the error estimation exceeds a threshold:
- identifies a second signal processing tool for the signal based on the task, the first category, and a determination that the first signal processing tool is ineffective; and
- instructs the monitoring facility to perform the task by applying the second signal processing tool to the signal.

15. The system of claim 13, wherein the signal is a set of measurements of a data server element of the data server.

16. The system of claim 15, wherein the data server element is a hardware component of the data server.

17. The system of claim 13, wherein the first signal processing tool is an algorithm applied to the signal in order to extract meaningful information from the signal to perform the task.

* * * * *